US010205997B2

(12) United States Patent
Epstein et al.

(10) Patent No.: US 10,205,997 B2
(45) Date of Patent: Feb. 12, 2019

(54) METHOD AND DEVICE FOR IDENTIFYING AND VERIFYING THE ILLEGITIMATE USE OF RESIDENTIAL SET-TOP BOXES

(71) Applicant: Cisco Technology, Inc., San Jose, CA (US)

(72) Inventors: Steven Jason Epstein, Hashmonaim (IL); Orly Ovadia Amsalem, Jerusalem (IL); Nadav Avikasis, Cfar-Adoomin (IL); Hillel Michael Solow, Beit Shemesh (IL)

(73) Assignee: Synamedia Limited (GB)

( * ) Notice: Subject to any disclaimer, the term of this patent is extended or adjusted under 35 U.S.C. 154(b) by 0 days.

(21) Appl. No.: 15/628,302

(22) Filed: Jun. 20, 2017

(65) Prior Publication Data
US 2018/0192131 A1  Jul. 5, 2018

Related U.S. Application Data

(60) Provisional application No. 62/441,815, filed on Jan. 3, 2017.

(51) Int. Cl.
*H04N 21/45* (2011.01)
*H04N 21/442* (2011.01)

(52) U.S. Cl.
CPC ... *H04N 21/4524* (2013.01); *H04N 21/44204* (2013.01); *H04N 21/44218* (2013.01); *H04N 21/44236* (2013.01)

(58) Field of Classification Search
CPC ......... H04N 21/4524; H04N 21/44204; H04N 21/44218
See application file for complete search history.

(56) References Cited

U.S. PATENT DOCUMENTS

| 8,730,870 | B2 | 5/2014 | Walter et al. |
| 9,077,755 | B2 | 7/2015 | Pacella et al. |
| 9,537,879 | B2 | 1/2017 | Blackwell |
| 2015/0256550 | A1 | 9/2015 | Taylor et al. |
| 2016/0182931 | A9* | 6/2016 | Setos ............... H04N 21/25816 725/25 |

FOREIGN PATENT DOCUMENTS

CN  105828199  8/2016

* cited by examiner

*Primary Examiner* — Hunter B Lonsberry
(74) *Attorney, Agent, or Firm* — Ronald S. Fernando; Fernando & Partners LLP

(57) ABSTRACT

In one illustrative example, TV usage data associated with a residential set-top box (STB) are obtained and stored over a plurality of repeated (e.g. weekly) time periods. TV usage pattern data associated with the residential STB are derived based on the stored TV usage data. A suspected illegitimate use of the residential STB is identified based on identifying a match or correlation between the TV usage pattern data and one of a plurality of predetermined commercial TV usage patterns. Further, for each listing data of one or more published listings of business hours, types, and themes associated with one or more commercial establishments, a comparison or correlation is performed between the TV usage pattern data and the listing data. A commercial establishment associated with illegitimate use is identified based on identifying a match or correlation between the TV usage pattern data and the listing data associated with the commercial establishment.

19 Claims, 12 Drawing Sheets

710

In which city do you want to seek out residential
STBs in commercial locations (RSiCL)?

| City | State |
|---|---|
| Hanover | Massachusetts |
| Hanover | Pennsylvania |
| Hanover | New york |
| Hanover Park | Illinois |
| Hanson | Massachusetts |
| Hapeville | Georgia |
| Harahan | Louisiana |
| Harker Heights | Pennsylvania |
| Harleysville | Texas |
| Harlingen | Michigan |
| Harper Woods | Tennessee |
| Harriman | Pennsylvania |
| Harrisburg | Illinois |
| Harrisburg | Arkansas |
| Harrison | Michigan |
| Harrison | New jersey |
| Harrison | New york |
| Harrison | Ohio |
| Harrison | New york |
| Harrison | Tennessee |
| Harrison | Pennsylvania |
| Harrison Township | Virginia |
| Harrisonburg | Missouri |
| Harrisonville | Kentucky |
| Harrodsburg | Connecticut |
| Hartford | Connecticut |
| Hartford | Wisconsin |
| Hartford | Vermont |
| Hartford City | Indiana |

FIG. 7A

PROBABLE RSiCL:

Account ID: 23459

| STB ID | Type | R/C | IP Address | Location |
|---|---|---|---|---|
| 12367 | HD | R | 124.56.12.345 | Carlisle |
| 23917 | SD | R | 124.56.12.345 | Carlisle |
| 34518 | HD | R | 145.67.902.369 | Harrisburg |

STB ID: 34518  Card ID: A5B38    RSiCL Likelihood: 97%

| Date | Channels | Time | #EPG Keys |
|---|---|---|---|
| Nov 1 | ESPN | 4:02PM - 2:01 AM | 25 |
| Nov 2 | EPSN | 4:12PM - 1:59 AM | 17 |
| Nov 3 | Fox Sports | 4:08PM - 2:03 AM | 27 |
| Nov 4 | ESPN2<br>ESPN | 4:16PM - 8:21 PM<br>8:21PM - 1:43 AM | 39 |
| Nov 5 | ESPN | 12:02PM -5:01 AM | 17 |
| Nov 6 | Fox Sports | 12:04PM - 1:45 AM | 17 |

PROBABLE Commercial Location:

Confidence: 81%

 1. Lancaster Brewing Company
★★★★★ 299 reviews
$$ - American (New), Pubs, Breweries
469 Eisenhower Blvd
Harrisburg, PA 17111
(717) 564-4448
4 PM - 2 AM Confidence: 43%

 3. Shady McGrady's
★★★★★ 29 reviews
$ - Restaurants, Pubs
204 Verbeke St
Harrisburg, PA 17102
(717) 234-4070
4 PM - 1 AM Confidence: 32%

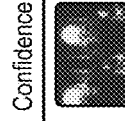 4. Zembie's
★★★★★ 26 reviews
$ - Pubs, Sports Bars, American (Traditional)
226 N 2nd St
Harrisburg, PA 17101
(717) 232-5020
5 PM - 2 AM

FIG. 7C

METHOD AND DEVICE FOR IDENTIFYING AND VERIFYING THE ILLEGITIMATE USE OF RESIDENTIAL SET-TOP BOXES

CROSS-REFERENCE TO RELATED APPLICATION

This application claims the benefit of U.S. Provisional Patent Application No. 62/441,815, filed on Jan. 3, 2017, the contents of which are hereby incorporated by reference for all purposes.

TECHNICAL FIELD

The present disclosure relates generally to computer-implemented techniques for use in identifying illegitimate use of residential set-top boxes (STBs), as well as identifying commercial establishments associated with the identified illegitimate use of the residential STBs.

BACKGROUND

Usage of residential set-top boxes (STBs) in commercial locations (RSiCLs) is a major problem for service providers (SPs).

As one simple example, a subscriber having a service agreement with an SP may lease or purchase an additional residential STB at a lower "residential" price, but make use of the additional residential STB at a commercial location for commercial use. Typically, commercial STBs command a much higher price than residential STBs. The illegitimate commercial use of the additional residential STB is a violation of the service agreement between the subscriber and the SP.

A typical mechanism for detecting such illegitimate use (sometimes referred to as "pub detection") is to send a multitude of operational security (OPSEC) workers simultaneously to a multitude of commercial establishments and use overt broadcast fingerprinting to display the IDs of the STBs. As is apparent, such a mechanism uses significant human resources and inconveniences both residential and commercial owners of legitimately used STBs.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIGS. 7A-7C are illustrations of an example user interface (UI), showing an operator selection of a scope of consideration (FIG. 7A), data points corresponding to suspicious devices within a city of interest located at corresponding predicted location of use (FIG. 7B), a proof of work for a (e.g. the most) probable commercial location for a suspected illegitimate use (FIG. 7C);

Figure 1:
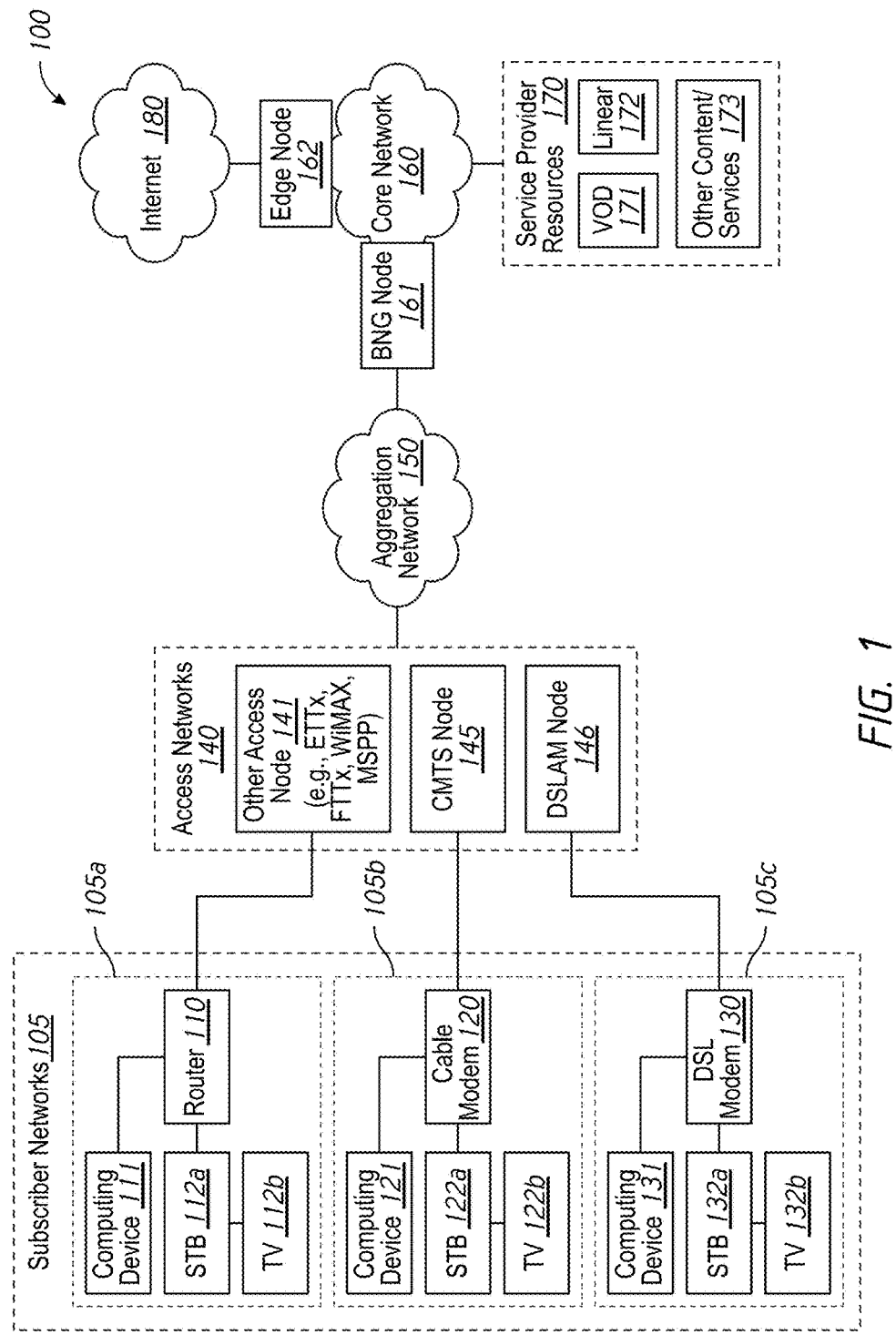
FIG. 1 is a block diagram of an example service provider (SP) access topology in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EXAMPLE EMBODIMENTS

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Overview

Techniques for use in identifying an illegitimate use of a residential set-top box (STB), as well as identifying a commercial establishment associated with such illegitimate use, are described herein.

In one illustrative example, one or more suspicious devices are determined within a scope that match a usage model within a predefined tolerance based on TV usage pattern data derived for the one or more suspicious devices. The one or more suspicious devices are suspected of being illegitimately used. A predicted location of use is determined for each of the one or more suspicious devices. Illegitimate use of at least some of the one or more suspicious devices is then verified.

In some implementations, TV usage data from a residential STB are obtained and stored over a plurality of repeated (e.g. weekly) time periods. TV usage pattern data of the residential STB are derived based on the stored TV usage data. A suspected illegitimate commercial use of the residential STB is identified based on identifying a match or correlation between the TV usage pattern data and a predetermined commercial TV usage pattern.

In addition, for each listing data of one or more published listings of business hours, types, or themes associated with one or more commercial establishments, a comparison or correlation is performed between the TV usage pattern data and the listing data. A commercial establishment associated with illegitimate use is identified based on identifying a match or correlation between the TV usage pattern data and the listing data associated with the commercial establishment.

EXAMPLE EMBODIMENTS

FIG. 1 is an example service provider (SP) access topology 100 which may provide the present techniques for identifying an illegitimate use of a residential set-top box (STB), as well as identifying a commercial establishment associated with illegitimate use of the residential STB. While pertinent features are shown in FIG. 1, those of ordinary skill in the art will appreciate from the present disclosure that various other features have not been illustrated for the sake of brevity and so as not to obscure more pertinent aspects of the example implementations disclosed herein. To that end, as a non-limiting example, the SP access topology 100 includes subscriber networks 105, access networks 140, an aggregation network 150, a core network 160, SP resources 170, and the Internet 180. As will be appreciated by one of ordinary skill in the art, the SP access topology 100 shown in FIG. 1 is merely an example topology, and, in other various implementations, the topology may be changed or rearranged.

According to some implementations, the SP access topology 100 of FIG. 1 corresponds to a SP that provides services/utilities to subscribers such as video-on-demand (VOD) content, linear television (TV) content, broadcast TV content, Internet access, voice-over-IP (VOIP), and/or the like. As shown in FIG. 1, the core network 160 is communicatively coupled (e.g., via a wired or wireless connection) to the Internet 180 via edge node 162. As shown in FIG. 1, the core network 160 is communicatively coupled (e.g., via a wired or wireless connection) to the aggregation network 150 via a broad network gateway (BNG) node 161. According to some implementations, the BNG node 161 aggregates subscriber sessions from the access networks 140. According to some implementations, the BNG node 161 provides policy management functionality and manages quality of service (QoS). As shown in FIG. 1, the core network 160 is communicatively coupled (e.g., via a wired or wireless connection) to SP resources 170 including VOD content 171, linear content 172, and other content/services 173.

As shown in FIG. 1, the aggregation network 150 is communicatively coupled (e.g., via a wired or wireless connection) to access networks 140. As shown in FIG. 1, the access networks 140 include other access node 141 (e.g., Ethernet-to-the-X (ETTx, where x could be premises, node, distribution point, curb, etc.), Fibre-to-the-X (FTTx, where x could be premises, node, distribution point, curb, etc.), WiMAX, multiservice provisioning platform (MSPP), and/or the like), a cable modem termination system (CMTS) node 145, and/or a digital subscriber line access multiplexer (DSLAM) node 146. According to some implementations, the SP provides one or more of the aforementioned access modalities, for example, only cable or digital subscriber line (DSL) access.

As shown in FIG. 1, the subscriber networks 105 correspond to consumer-side networks with associated consumer premises equipment (CPE). As one example, the other access node 141 is communicatively coupled (e.g., via a wired or wireless connection) to the consumer network 105a that includes a router 110, a computing device 111 (e.g., a laptop computer, desktop computer, over-the-top (OTT) box, tablet computing device, mobile phone, and/or the like), and a set-top box (STB) 112a with an associated TV 112b. According to some implementations, the consumer network 105a includes additional networking devices (not shown) such as access points, routers, switches, hubs, and/or the like.

As another example, the CMTS node 145 is communicatively coupled (e.g., via a wired or wireless connection) to the consumer network 105b that includes a cable modem 120, a computing device 121 (e.g., a laptop computer, desktop computer, OTT box, tablet computing device, mobile phone, and/or the like), and an STB 122a with an associated TV 122b. According to some implementations, the consumer network 105b includes additional networking devices (not shown) such as access points, routers, switches, hubs, and/or the like.

As yet another example, the DSLAM node 146 is communicatively coupled (e.g., via a wired or wireless connection) to the consumer network 105c that includes a DSL modem 130, a computing device 131 (e.g., a laptop computer, desktop computer, OTT box, tablet computing device, mobile phone, and/or the like), and an STB 132a with an associated TV 132b. According to some implementations, the consumer network 105c includes additional networking devices (not shown) such as access points, routers, switches, hubs, and/or the like. As will be appreciated by one of ordinary skill in the art, the subscriber networks 105 shown in FIG. 1 are merely exemplary with an arbitrary number of associated devices, and, in other various implementations, the subscriber networks 105 may include more or less associated devices (e.g., additional computing devices and/or STBs with associated TVs).

Figure 2:
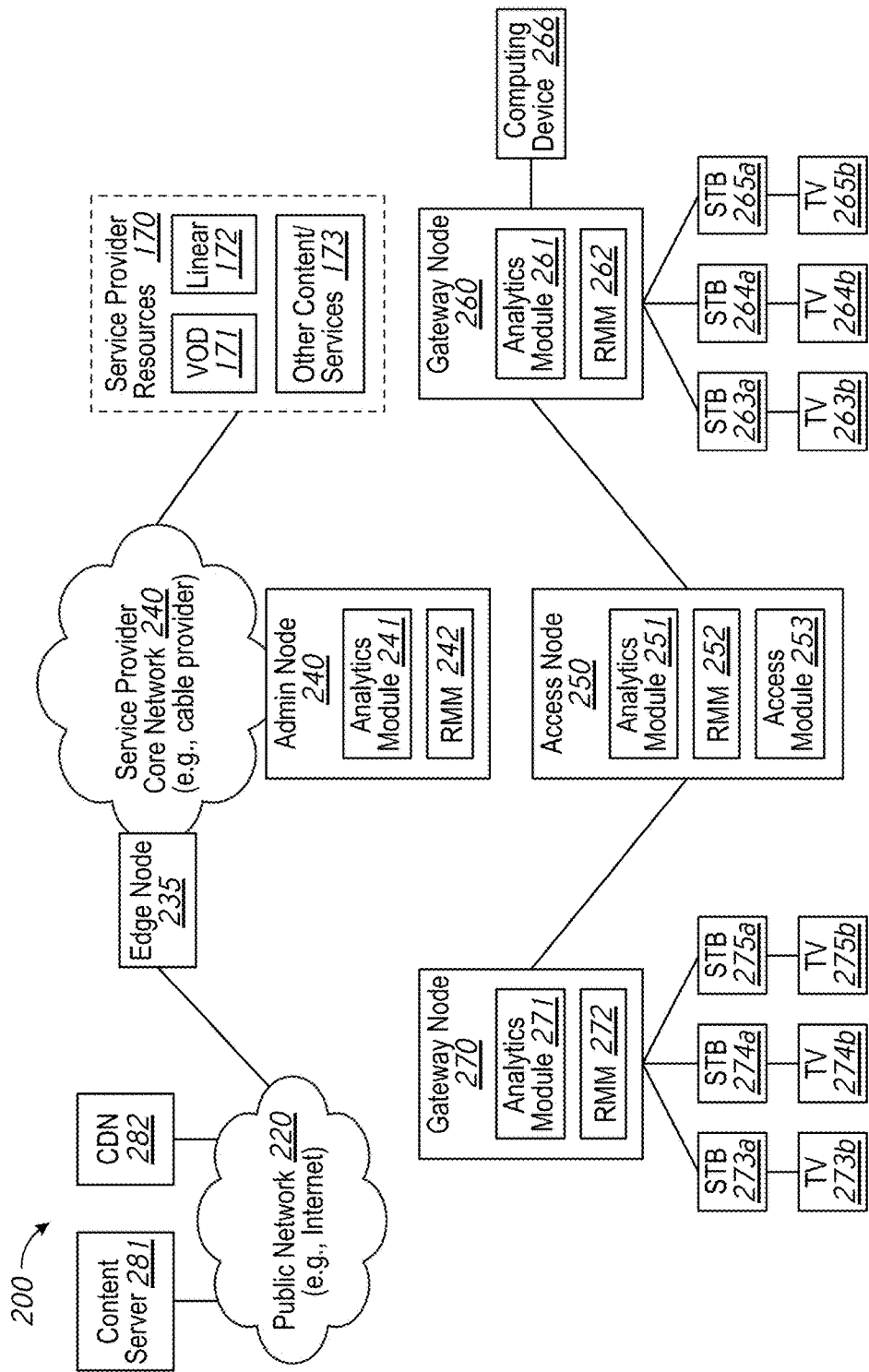
FIG. 2 is a block diagram of a data communication environment in accordance with some implementations.

FIG. 2 is a block diagram of a data communication environment 200 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the data communication environment 200 includes: a public network 220 (e.g., a portion of the Internet), a service provider core network 240 (hereinafter the "core network 240"), service provider (SP) resources 170, an administration (admin) node 245, and an access node 250.

As shown in FIG. 2, the data communication environment 200 also includes subscriber gateway nodes 260, 270 and a number of subscriber devices 263a/b, 264a/b, 265a/b, 266, 273a/b, 274a/b, and 275a/b. For example, the subscriber devices 263a, 264a, 265a, 273a, 274a, and 275a correspond to set-top boxes (STBs), and the subscriber devices 263b, 264b, 265b, 273b, 274b, and 275b correspond to television (TV) sets. As one example, the computing device 266 corresponds to a laptop computer, desktop computer, over-the-top (OTT) box, tablet computing device, mobile phone, or the like. In some implementations, the access node 250 is similar to and adapted from the CMTS node 145 or the DSLAM node 146 in FIG. 1. In some implementations, the gateway nodes 260, 270 are similar to and adapted from the cable modem 120 or the DSL modem 130 in FIG. 1.

In some implementations, the core network 240 includes a private and/or subscription-based network. The core network 240 includes any local area network (LAN) and/or wide area network (WAN) such as an intranet, an extranet, a virtual private network, and/or portions of the Internet. In some implementations, the core network 240 provides communication capability between any one of the subscriber devices 263a/b, 264a/b, 265a/b, 266, 273a/b, 274a/b, and 275a/b and one or more third party service providers and/or content providers (e.g., the content server 281, the content delivery network (CDN) node 282, etc.). In some implementations, the core network 240 provides communication capability between any one of the subscriber devices 263a/b, 264a/b, 265a/b, 266, 273a/b, 274a/b, and 275a/b and the public network 220 and the SP resources 170 including VOD content 171, linear content 172, and other content/services 173. In various implementations, the core network 240 includes a combination of computing devices, switches, routers, server systems, enterprise memory, data connections, and/or the like.

In some implementations, the core network 240 uses HTTP (hypertext transport protocol) to transport information using the TCP/IP (transmission control protocol/Internet protocol) suite. HTTP permits client devices to access various resources available via the core network 240 and/or the public network 220. However, implementations are not limited to the use of any particular protocol. One having ordinary skill in the art should understand that other networks distributing multimedia (e.g., video, graphics, audio, and/or data, or otherwise referred to also herein individually or collectively as media content or simply, content) may also benefit from certain embodiments of adaptive streaming systems and methods, and hence, are contemplated to be within the scope of the disclosure.

As shown in FIG. 2, in some implementations, the core network 240 includes an edge node 235 that provides an interface for data communication external to the core network 240 (e.g., to the public network 220, the content server 281, the CDN node 282, etc.). In some implementations, the edge node 235 is provided as a single entity (e.g., a server, a virtual machine, etc.). In some implementations, the edge node 235 is implemented as a distributed system including a suitable combination of software, data structures, virtual machines, computing devices, servers, switches, and/or routers. For the sake of brevity and convenience of explanation, the edge node 235 is described herein as a single entity.

The core network 240 also includes a network administration node 245 (or the like), which is arranged to monitor and/or manage one or more access/headend nodes. Similar to the edge node 235, the network administration node 245 is illustrated as single entity (e.g., a server, a virtual machine, etc.) in FIG. 2. In various implementations, however, the network administration node 245 is provided as a distributed system including a suitable combination of software, data structures, virtual machines, computing devices, servers, switches, and/or routers. Accordingly, the network administration node 245 is described herein as a single entity merely for the sake of brevity and convenience of explanation.

In some implementations, the network administration node 245 includes at least one of an analytics module 246 and a resource management module (RMM) 247. According to some implementations, the analytics module 246 is provided to monitor service usage by subscribers and collect associated data. According to some implementations, the RMM 247 is configured to manage access and network resources.

The access node 250 is coupled to the network administration node 245 and/or one or more other portions of the core network 240. In some implementations, the access node 250 is capable of data communication using the public network 220 and/or other private networks (not shown). Those of ordinary skill in the art will appreciate that, according to some implementations, the access node 245 is typically configured to deliver cable television (TV), cable modem services, and/or various other data services to subscriber client devices. To that end, an access node 250 (e.g., a headend node) includes a suitable combination of software, data structures, virtual machines, routers, switches, and high-availability servers. For example, the access node 250 includes an access module 253 (e.g., a cable modem termination system (CMTS)) that is used to service an allocation of bandwidth shared by a number of client devices. The access module 253 includes a suitable combination of hardware, software, and/or firmware for terminating one or more data channels associated with a number of client devices within the shared allocation of bandwidth.

In some implementations, the access node 250 includes at least one of an analytics module 251 and an RMM 252. According to some implementations, the analytics module 251 is provided to monitor service usage by subscribers and collect associated data. According to some implementations, the RMM 252 is configured to manage access and network resources Further, while the analytics module 251 and the RMM 252 are shown as distinct modules, in some implementations, some or all of the functions of each are incorporated into the access module 253 or the like.

In some implementations, the subscriber devices 263a/b, 264a/b, 265a/b, 266, 273a/b, 274a/b, and 275a/b access network resources, services, and content offerings from a respective access/headend node through subscriber gateway nodes. For example, as shown in FIG. 2, the subscriber gateway nodes 260, 270 are coupled to the access node 250, and thus share bandwidth (and/or other resources) available through the access node 250. In various implementations, a subscriber gateway node includes, without limitation, devices such as cable modems (CMs), routers, wireless access points, Ethernet modems, or the like.

Each of the subscriber gateway nodes 260, 270 is accessible by and services a number of subscriber devices. For example, the subscriber gateway node 260 is coupled to and delivers services and/or content to the subscriber devices 263a/b, 264a/b, 265a/b, and 266. Similarly, the subscriber gateway node 270 is coupled to and delivers services and/or content to the subscriber devices 273a/b, 274a/b, and 275a/b. Those of ordinary skill in the art will appreciate from the present disclosure that, in various implementations, an access/headend node can be connected to any number and combination of subscriber gateway nodes and subscriber devices, and FIG. 2 is merely an example provided to discuss aspects of various implementations.

In some implementations, the subscriber gateway nodes 260, 270 are configured to manage access and/or assist in the management of network resources available to corresponding subscriber devices. To that end, for example, the subscriber gateway node 260 includes an analytics module 261 and an RMM 262. In the example shown in FIG. 2, the analytics module 261 and an RMM 262 are provided, individually or in combination, to manage access or assist in the management of network resources available to subscriber devices 263a/b, 264a/b, 265a/b, and 266.

Similarly, the subscriber gateway node 270 includes an analytics module 271 and an RMM 272. In the example shown in FIG. 2, the analytics module 271 and an RMM 272 are provided, individually or in combination, to manage access or assist in the management of network resources available to subscriber devices 273a/b, 274a/b, and 275a/b. In some implementations, each of the analytics modules 261, 271 and the RMMs 262, 272 include one or more respective functions of the corresponding the analytics modules 246, 251 and the resource management modules 247, 252 discussed above.

With continued reference to FIG. 2, the content server 281 is configured to store and provide media content data, for example, to the subscriber devices 263a/b, 264a/b, 265a/b, 266, 273a/b, 274a/b, and 275a/b. To that end, the content server 281 typically includes a non-transitory memory, one or more processing units (CPUs), an input-output (I/O) interface, and a network interface. The network interface is configured to enable communication with other devices and systems, and for example, without limitation includes a modulator/demodulator (modem for communication with another device, system, or network), a radio frequency transceiver or another type of transceiver, a telephone interface, a bridge, a router, etc. In some implementations, the I/O interface includes input devices, such as but not limited to, a keyboard, mouse, scanner, microphone, etc. The I/O interface may also include output devices, such as but not limited to, a display, speakers, etc. According to some implementations, the CDN node 282 caches media content data provided by the content server 281.

Detection of illegitimate use of residential STBs may be made in the context shown and described above in relation to FIGS. 1 and 2. In some implementations, detection may be made with use of predictive analytics.

Figure 3A:
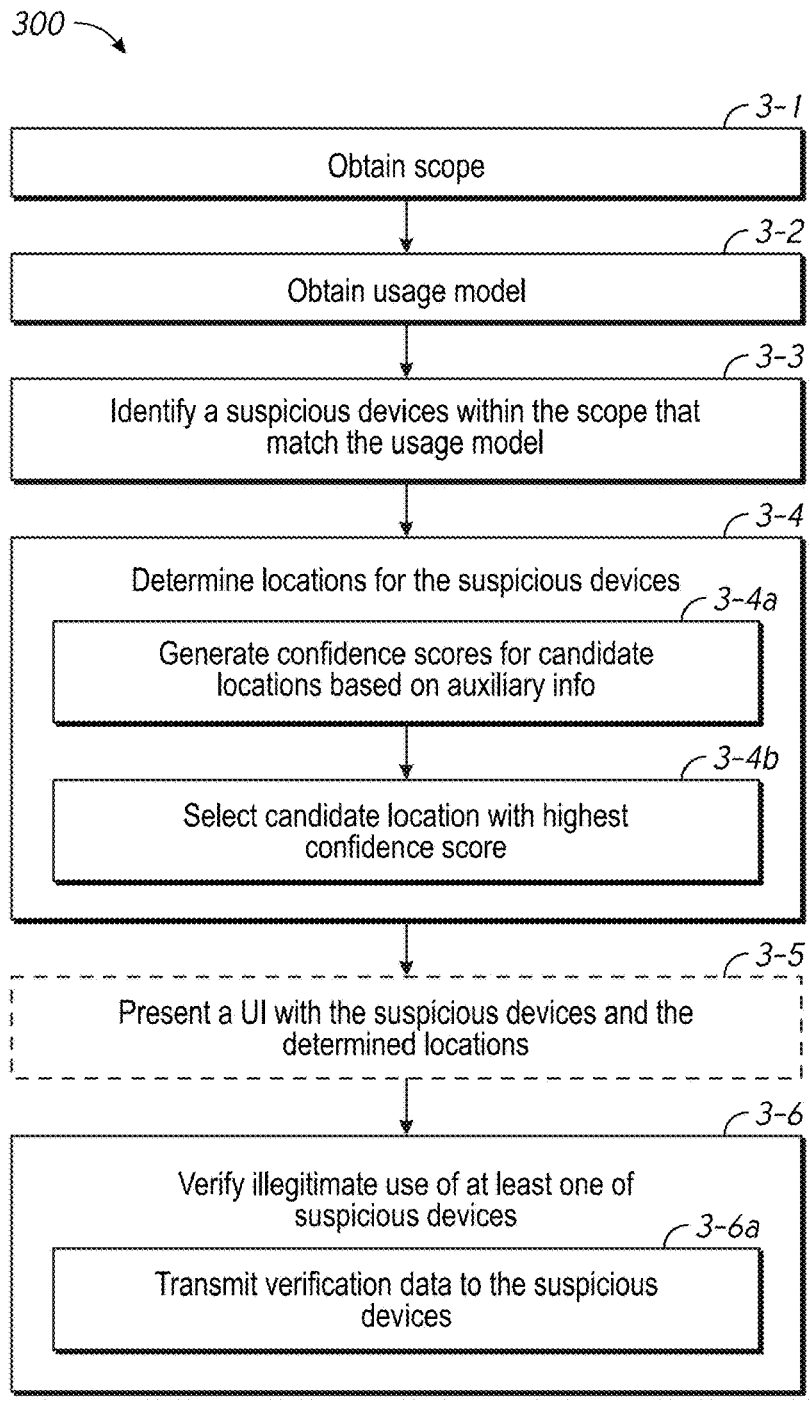
FIGS. 3A-3B are flowchart representations of methods for use in identifying and verifying illegitimate use of residential set-top boxes (STBs) in accordance with some implementations.

FIG. 3A is a flowchart representation of a method 300 of identifying and verifying illegitimate use of residential STBs in accordance with some implementations. In various implementations, the method 300 is performed by a device with one or more processors and non-transitory memory such as a portion or module of the administrative node 240 or the access node 250 in FIG. 2. In some implementations, the method 300 is performed by processing logic, including hardware, firmware, software, or a combination thereof. In some implementations, the method 300 is performed by a processor executing code stored in a non-transitory computer-readable medium (e.g., a memory). In some implementations, the techniques of the present disclosure assume that STBs are (consistently) connected and configured for two-way communications.

To that end, as represented by block 3-1, the method 300 includes obtaining a scope. For example, the operator provides or selects the scope. In some implementations, the scope corresponds to a geographic area such as a city, zip code, or neighborhood. As one example, FIG. 7A show a user interface (UI) 710 whereby the operator select a scope—a city corresponding to Harrisburg, Pa. in this example.

As represented by block 3-2, the method 300 includes obtaining a usage model. In one example, the usage model is obtained based on the scope. In another example, the usage model is provided by the operator or selected from a set of tuned usage models to discover a corresponding subset of RSiCLs with a high degree of confidence. In some implementations, the usage model corresponds to a business type such as a sports bar, barber shop, upscale restaurant, dentist office, or the like. In yet another example, a default usage model for RSiCLs is retrieved from a data store.

As one example, a first usage model corresponding to a sports bar is associated with a first set of characteristics such as tuning into sports channels from the business opening time to the business closing time, setting the volume to either mute or a high volume, minimal EPG (electronic programming guide) or UI (user interface) interactions, and/or the like. As another example, a second usage model corresponding to a dentist office is associated with a second set of characteristics such as tuning to news channels from the business opening time to the business closing time, setting the volume to a low or medium volume, minimal EPG or UI interactions, and/or the like.

As represented by block 3-3, the method 300 includes identifying suspicious devices (e.g., STBs) within the scope that match the usage model. This step may be performed based on TV usage pattern data derived for the STBs. In some implementations, the device or a component thereof (e.g., the administrative node 240 or the access node 250 in FIG. 2) identifies a set of devices (e.g., STBs) within the scope that match the usage model within a predefined tolerance (e.g., 10%). In some implementations, the device or a component thereof (e.g., the administrative node 240 or the access node 250 in FIG. 2) filters the set of devices within the scope that match the usage model to identify suspicious devices that are potentially associated with illegitimate use (e.g., a residential STB being used in a commercial location). For example, the suspicious devices have at least a predefined probability (e.g., 60%) of being associated with illegitimate use. For example, known commercial STBs are also filtered out.

Figure 5:
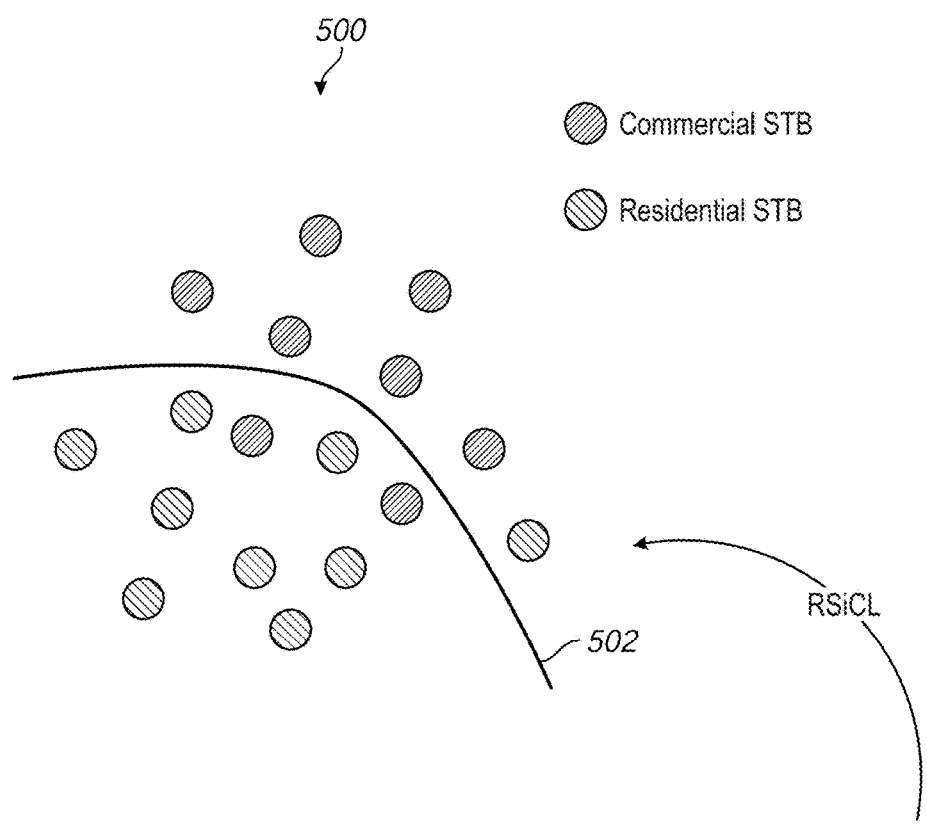
FIG. 5 is an illustrative example of a graph indicating a set of devices within a scope that matches a usage model within a predefined tolerance.

As one example, as shown in FIG. 5, the graph 500 shows the set of devices within the scope that match the usage model within the predefined tolerance. Continuing with this example, the devices associated with data points below the line 502 are filtered out as either being associated with legitimate use or being associated with a probability of illegitimate use lower than the predefined probability. As such, in this example, the devices associated with data points above the line 502 are identified as the suspicious devices.

According to some implementations, the method 300 uses a predictive analytics algorithm to detect one or more the residential STBs in commercial locations (RSiCL) per a city of interest. In some implementations, the predictive analytics algorithm uses semi-supervised learning with active learning, as described below, to train the usage model to detect residential STBs that have similar behavior to legal commercial STBs. For example, the usage model features that will be used to locate these STBs include:
  a) STBs, based on their IP addresses, are not co-located with other STBs associated with the same account or billing address;
  b) High definition (HD) STBs;
  c) Tuning patterns of STBs, especially focused on STBs tuned throughout large contiguous durations of time to the same sports or news channel;
  d) STBs whose EPG are barely used even when powered on and not in standby;
  e) STBs that are powered on and off consistently at the same approximate times and on weekdays;
  f) Volume level of STBs; and
  g) Other features and similarities between this residential STBs and commercial STBs determined by data science algorithms such as principle component analysis (PCA).

According to some implementations, the semi-supervised learning algorithm, as described below, will work as follows using the usage model features described above. The predictive analytics algorithm uses semi-supervised learning with active learning. Active learning is a technique to query a user regarding the desired output a data point should have, in order to incorporate it back in the algorithm, and improve results. In the case of detecting RSiCLs, some of the data points are labeled as "commercial" as their owners are law-abiding, while the rest could be either residential or commercial with some probability. In our active learning method, the data set is split into three groups:
  a) $T_l$: The data points for which we know the label for;

b) $T_u$: The data points for which we do not know the label for; and
c) $T_c$: The data points which we choose to be labeled (by the user).

According to some implementations, active learning is useful in this case, for at least the following reasons: there is a low percentage of labeled data; if a STB is suspected to be RSiCL, most times some kind of manual checks will be needed; and manually checking if an STB is RSiCL is complex as such it is beneficial to reduce the cases to the ones that will most likely contribute to the accuracy of our algorithm. In some implementations, the algorithm flow is as follow: For $T_l$, the labeled data set, we use supervised learning algorithm such as support vector machines (SVM) and/or random forest (RF). For example, RF improves the results of a single decision tree, as it consists of a forest of decision trees, where the decision is made by majority voting. RF is also known for its ability to resist overfitting the data. The learned algorithm is applied against $T_u$, the unlabeled data set.

As one example, "Query by Committee" is used as the active learning query strategy. This query strategy aids in choosing $T_c$, the user labeled data set. In this case, the "Query by Committee" strategy uses RF as the training algorithm, then uses the learned model on the unlabeled data, and then chooses the points that the committee (of RF) agrees upon the least for further investigation. Once these points are labeled by the user, they are then used again in the training process to obtain significant improvement over the previous results.

As represented by block 3-4, the method 300 includes determining locations for the suspicious devices. According to some implementations, the device or a component thereof (e.g., the administrative node 240 or the access node 250 in FIG. 2) determines a specific location where each of the suspect RSiCLs is likely to reside. The specific location of the device may be a commercial location (e.g. a "pub"). As one example, this is accomplished by gathering information related to restaurants and pubs in the city of interest from GOOGLE MAPS API, YELP API, YELLOW PAGE listings, and/or the like, and comparing their properties to that of the suspect STB. In some implementations, the data science characteristics used in predicting the specific location, using algorithms such as a decision trees, include:
  a) Is the location found in a location consistent with suspect STB IP address;
  b) Is the location open on weekdays during times consistent with the power up data and tuning data of that suspect STB (RSiCL);
  c) Is the location based on its name and/or preferred clientele likely to tune to programs described in the tuning data (e.g., a sports bar will tune to sports channels); and
  d) Other similar characteristics.

According to some implementations, as represented by block 3-4a, determining locations for the suspicious devices includes generating confidence scores for candidate locations based on auxiliary information. In some implementations, a set of candidate locations is determined from a listing of locations within the scope scraped from auxiliary information (e.g., all sports bars in a city of interest). According to some implementations, the auxiliary information includes extrinsic information, such as operating hours and business description, gathered from third party locations such as WIKIPEDIA listings, GOOGLE MAPS API, YELP API, YELLOW PAGE listings, and/or the like. According to some implementations, the auxiliary information also includes intrinsic information, such as power on/off times, tuned to channels, EPG interaction, and/or the like, gathered from the suspicious STBs.

According to some implementations, some locations can be matched to existing commercial subscriptions and can thus be ignored. As one example, existing commercial subscription information may be shared across service providers such that paying commercial subscriptions can be filtered out. In some implementations, the other commercial locations, they can be evaluated using data science techniques against a usage model (e.g., built from known previous offenders), to determine sort how likely it is that the commercial location has a TV setup with a non-commercial account (e.g., a bar that advertises itself as a sports bar is likely to have a device tuned to sports channels). Given a set of suspicious devices and a set of candidate locations, the device assigns a confidence score indicating how well each candidate location matches each suspicious device.

Figure 6:
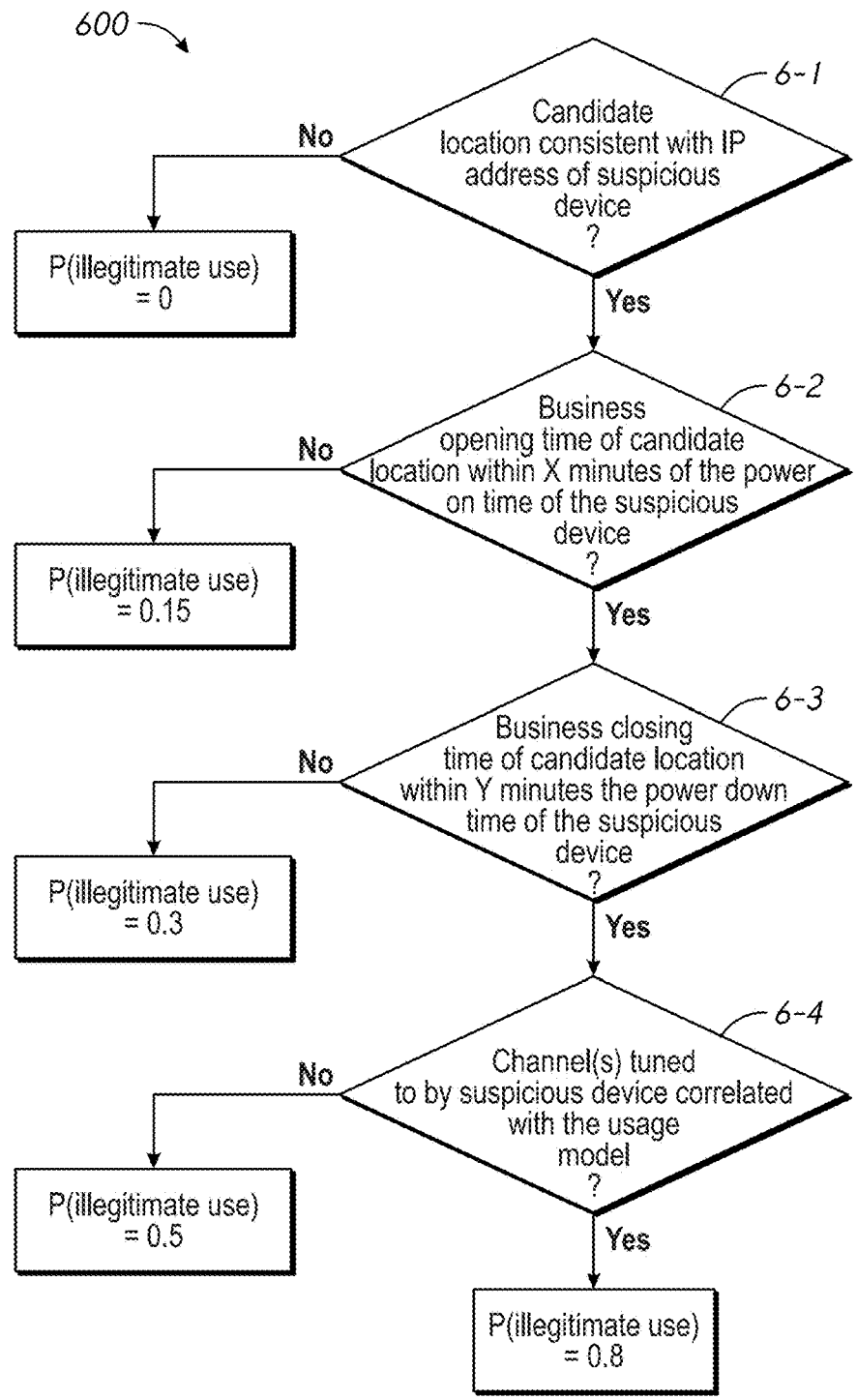
FIG. 6 shows an example decision tree which may be used to generate a confidence score for each of the candidate locations.

As one example, FIG. 6 shows an example decision tree 600 used to generate a confidence score for each of the candidate locations. As will be appreciated by one of ordinary skill in the art, the decision tree 600 shown in FIG. 6 is merely an example decision tree, and, in other various implementations, the decision tree may be rearranged, may include less/more decisions, and the probabilities may be associated with different values.

As represented by block 6-1, the decision tree 600 includes determining whether the candidate location is consistent with the IP address of the suspicious device. If the candidate location is not consistent with the IP address of the suspicious device (e.g., the "No" branch), the probability of illegitimate use (e.g., the confidence score) associated with the candidate location is, for example, 0. If the candidate location is consistent with the IP address of the suspicious device (e.g., the "Yes" branch), the decision tree 600 continues to block 6-2.

As represented by block 6-2, the decision tree 600 includes determining whether the business opening time of the candidate location is within X minutes of the power on time of the suspicious device. If the business opening time of the candidate location is not within X minutes of the power on time of the suspicious device (e.g., the "No" branch), the probability of illegitimate use (e.g., the confidence score) associated with the candidate location is, for example, 0.15. If the business opening time of the candidate location is within X minutes of the power on time of the suspicious device (e.g., the "Yes" branch), the decision tree 600 continues to block 6-3.

As represented by block 6-3, the decision tree 600 includes determining whether the business closing time of the candidate location is within Y minutes of the power down time of the suspicious device. If the business closing time of the candidate location is not within Y minutes of the power down time of the suspicious device (e.g., the "No" branch), the probability of illegitimate use (e.g., the confidence score) associated with the candidate location is, for example, 0.3. If the business closing time of the candidate location is within Y minutes of the power down time of the suspicious device (e.g., the "Yes" branch), the decision tree 600 continues to block 6-4.

As represented by block 6-4, the decision tree 600 includes determining whether the channel(s) tuned to by the suspicious device are correlated with the usage model. If the channel(s) tuned to by the suspicious device are not correlated with the usage model (e.g., the "No" branch), the probability of illegitimate use (e.g., the confidence score) associated with the candidate location is, for example, 0.5.

If the channel(s) tuned to by the suspicious device are correlated with the usage model (e.g., the "Yes" branch), the probability of illegitimate use (e.g., the confidence score) associated with the candidate location is, for example, 0.8.

According to some implementations, as represented by block 3-4b, determining locations for the suspicious devices includes selecting a candidate location with the highest confidence score. In some implementations, after determining confidence scores for each of the candidate locations for a suspicious device, the device or a component thereof (e.g., the administrative node 240 or the access node 250 in FIG. 2) selects the candidate location with the highest confidence score as the most likely location of the suspicious device.

According to some implementations, as represented by block 3-5, the method 300 includes presenting a user interface (UI) with the suspicious devices and the determined locations. Once the prediction in block 3-4 is completed, in some implementations, the device or a component thereof (e.g., the administrative node 240 or the access node 250 in FIG. 2) provides a list of suspicious devices and the most likely location for each suspicious device.

As represented by block 3-6, the method 300 includes verifying illegitimate use of at least one of the suspicious devices. According to some implementations, the prediction in block 3-4 minimizes the operating expense of operational security measures used to verify illegitimate use of a suspicious device. For example, the prediction of the most likely location for a RSiCL from block 3-4 reduces the manpower used to verify illegitimate use. Continuing with this example, the prediction of the most likely location for a RSiCL from block 3-4 also limits the number of STBs subjected to the verification process. This solution stands in contrast to the current situation, where hundreds of people canvass commercial locations in a city of interest, and the entire STB population of the city of interest is directed to display a verification fingerprint.

According to some implementations, as represented by block 3-6a, verifying illegitimate use of at least one of the suspicious devices includes transmitting verification data to the suspicious devices. According to some implementations, the device sends targeted verification data based on the prediction in block 3-4. For example, the SP or another entity sends a single OPSEC engineer to the predicted suspect commercial establishment containing the suspected RSiCL. Continuing with this example, during this time, verification data is transmitted to the suspected RSiCL, such as: "Please make sure your STB is plugged in." Continuing with this example, the presence of this message by the OPSEC engineer at this time will verify that this is the suspected RSiCL is a true or false positive. According to some implementations, after verifying whether the suspected RSiCL is a true or false positive, this feedback data is passed back into our algorithm in order to improve the algorithm by retraining/tuning the algorithm with the feedback data.

Figure 3B:
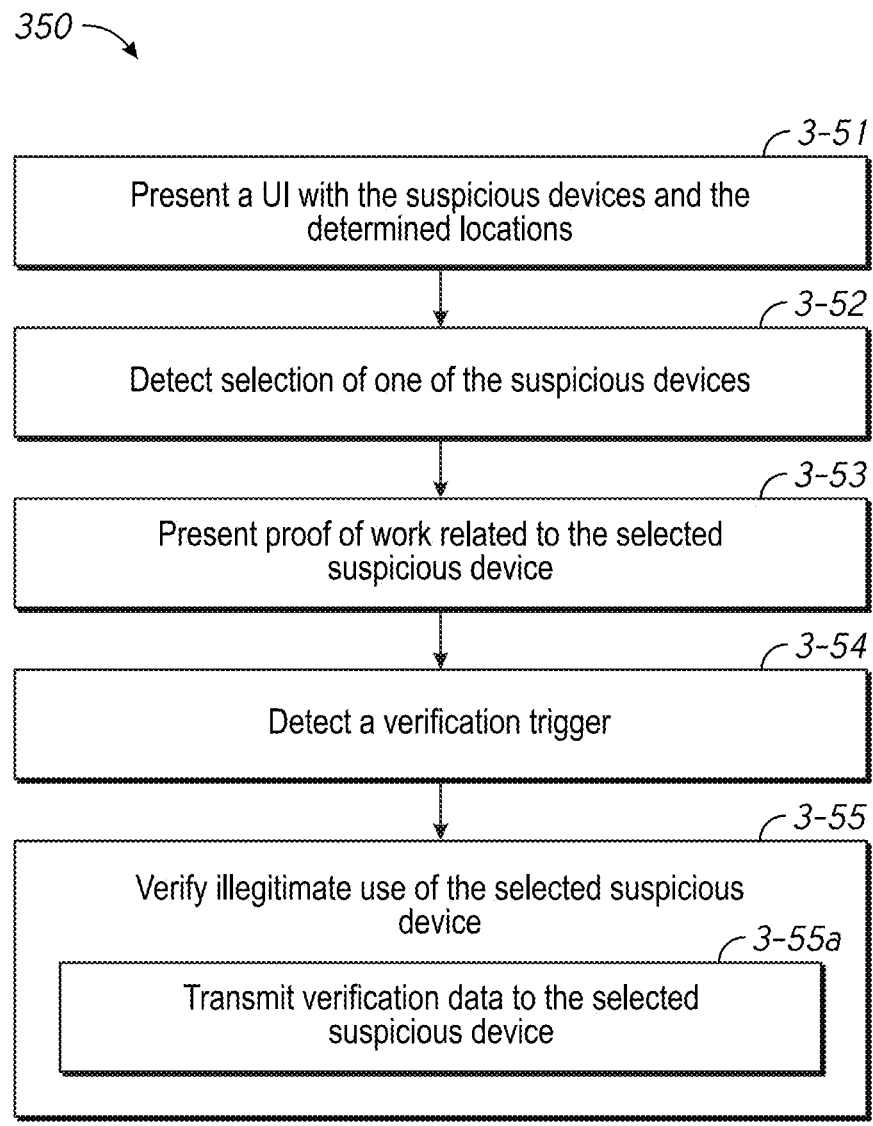

FIG. 3B is a flowchart representation of a method 350 of identifying and verifying illegitimate use of residential STBs in accordance with some implementations. In various implementations, the method 350 is performed by a device with one or more processors and non-transitory memory such as a portion or module of the administrative node 240 or the access node 250 in FIG. 2. In some implementations, the method 350 is performed by processing logic, including hardware, firmware, software, or a combination thereof. In some implementations, the method 350 is performed by a processor executing code stored in a non-transitory computer-readable medium (e.g., a memory).

Figure 7B:
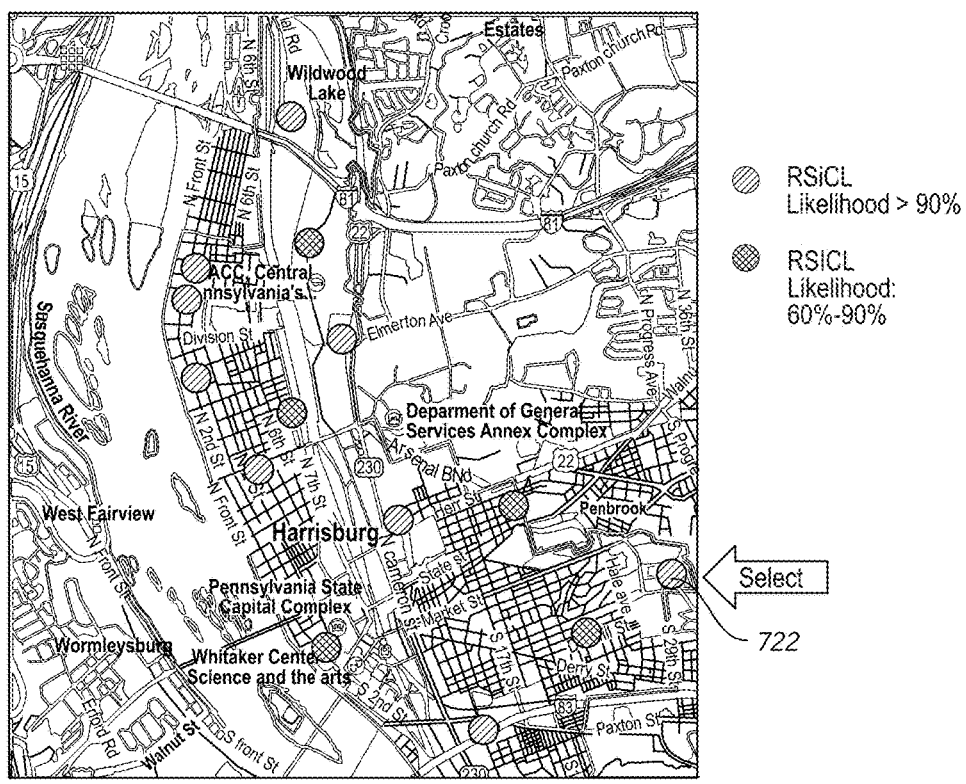

To that end, as represented by block 3-51, the method 350 includes presenting a user interface (UI) with the suspicious devices and the determined locations. As one example, FIG. 7B show a user interface (UI) 720 shows data points that correspond to suspicious devices within a city of interest (e.g., Harrisburg, Pa.) located at corresponding predicted locations of use. In this example, the data points are organized (e.g., color-coded) according to degree of confidence that a suspicious device is located at the predicted location of use.

As represented by block 3-52, the method 350 includes detecting selection of one of the suspicious devices. For example, with reference to FIG. 7B, the operator selects the data point 722 within the UI 720.

As represented by block 3-53, the method 350 includes presenting proof of work related to the selected suspicious device. As one example, FIG. 7C show a UI 730 that illustrates proof of work for the most probable commercial location for a suspected RSiCL. As shown in FIG. 7C, the suspected account (e.g., account ID number 23459) is associated with three STBs (e.g., STB ID numbers 12367, 23917, 34518). There is an asymmetry between the IP address and location of STB ID numbers 12367 and 23917, and the IP address and location of STB ID number 34518. As such, STB ID number 34518 is a suspicious device. As shown in FIG. 7C, STB ID number 34518 is associated with a 97% probability of illegitimate use (e.g., a 97% likelihood of being a RSiCL) based on the channel(s) tuned to, the power on/off times, and the number of EPG interactions. As shown in FIG. 7C, the confidence score that STB ID number 34518 is located at the "Lancaster Brewing Company" is 81% as compared to a 43% confidence score for "Shady McGrady's" and a 32% confidence score for "Zembie's".

As represented by block 3-54, the method 350 includes detecting a verification trigger. For example, with reference to FIG. 7C, the operator selects a verification affordance (not shown) associated with the "Lancaster Brewing Company" within the UI 730.

As represented by block 3-55, the method 350 includes verifying illegitimate use of the selected suspicious device. According to some implementations, as represented by block 3-55a, verifying illegitimate use of the selected suspicious device includes transmitting verification data to the selected suspicious device. Continuing with the example above, in response to selection of the verification affordance associated with the "Lancaster Brewing Company", a targeted verification information is transmitted to STB ID number 34518 and an OPSEC engineer may visit the "Lancaster Brewing Company" to confirm that the verification information is presented by a TV located at the "Lancaster Brewing Company."

Figure 4:
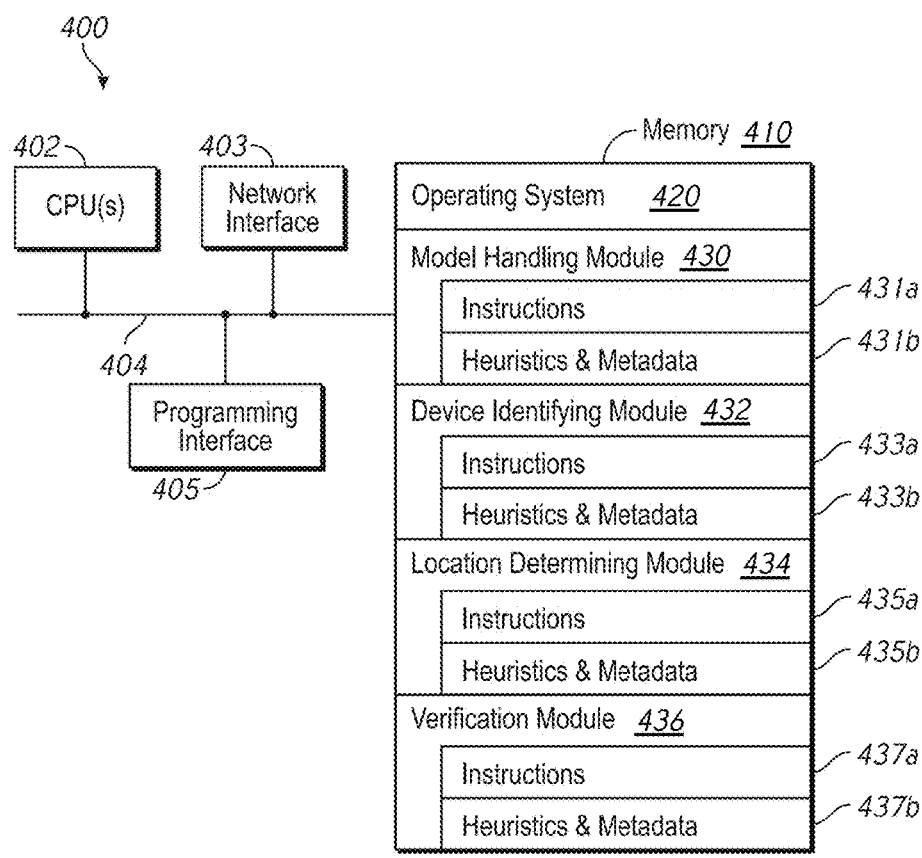
FIG. 4 is a block diagram of an example of a device configured in accordance with some implementations.

FIG. 4 is a block diagram of an example of a device 400 in accordance with some implementations. For example, in some implementations, the device 400 is similar to and adapted from access node 250 or administrative node 240 in FIG. 2. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 400 includes one or more processing units (CPUs) 402, one or more network interfaces 403, a memory 410, a programming (I/O) interface 408, and one or more communication buses 404 for interconnecting these and various other components.

In some implementations, the one or more communication buses 404 include circuitry that interconnects and controls communications between system components. The memory 410 includes high-speed random access memory, such as DRAM, SRAM, DDR RAM, or other random access solid state memory devices. In some implementations, the memory 410 includes non-volatile memory, such as one or more magnetic disk storage devices, optical disk storage devices, flash memory devices, or other non-volatile solid state storage devices. The memory 410 optionally includes one or more storage devices remotely located from the one or more CPUs 402. The memory 410 comprises a non-transitory computer readable storage medium. In some implementations, the memory 410 or the non-transitory computer readable storage medium of the memory 410 stores the following programs, modules and data structures, or a subset thereof including an optional operating system 420, a model handling module 430, a device identifying module 432, a location determining module 434, and a verification module 436.

The operating system 420 includes procedures for handling various basic system services and for performing hardware dependent tasks.

In some implementations, the model handling module 430 is configured to train and maintain usage models. To that end, in various implementations, the model handling module 430 includes instructions and/or logic 431a, and heuristics and metadata 431b.

In some implementations, the device identifying module 432 is configured to identify suspicious devices (e.g., STBs). To that end, in various implementations, the device identifying module 432 includes instructions and/or logic 433a, and heuristics and metadata 433b.

In some implementations, the location determining module 434 is configured to determine a location associated with the suspicious devices identified by the device identifying module 432. To that end, in various implementations, the location determining module 434 includes instructions and/or logic 435a, and heuristics and metadata 435b.

In some implementations, the verification module 436 is configured to verify that a suspicious device identified by the device identifying module 432 is located at the located determined by the location determining module 434. To that end, in various implementations, the verification module 436 includes instructions and/or logic 437a, and heuristics and metadata 437b.

Although the model handling module 430, the device identifying module 432, the location determining module 434, and the verification module 436 are illustrated as residing on a single device (e.g., the device 400), it should be understood that in other implementations, any combination of the model handling module 430, the device identifying module 432, the location determining module 434, and the verification module 436 may reside on separate devices.

Moreover, FIG. 4 is intended more as functional description of the various features which be present in a particular embodiment as opposed to a structural schematic of the implementations described herein. As recognized by those of ordinary skill in the art, items shown separately could be combined and some items could be separated. For example, some functional modules shown separately in FIG. 4 could be implemented in a single module and the various functions of single functional blocks could be implemented by one or more functional blocks in various implementations. The actual number of modules and the division of particular functions and how features are allocated among them will vary from one embodiment to another and, in some implementations, depends in part on the particular combination of hardware, software, and/or firmware chosen for a particular embodiment.

Figure 8:
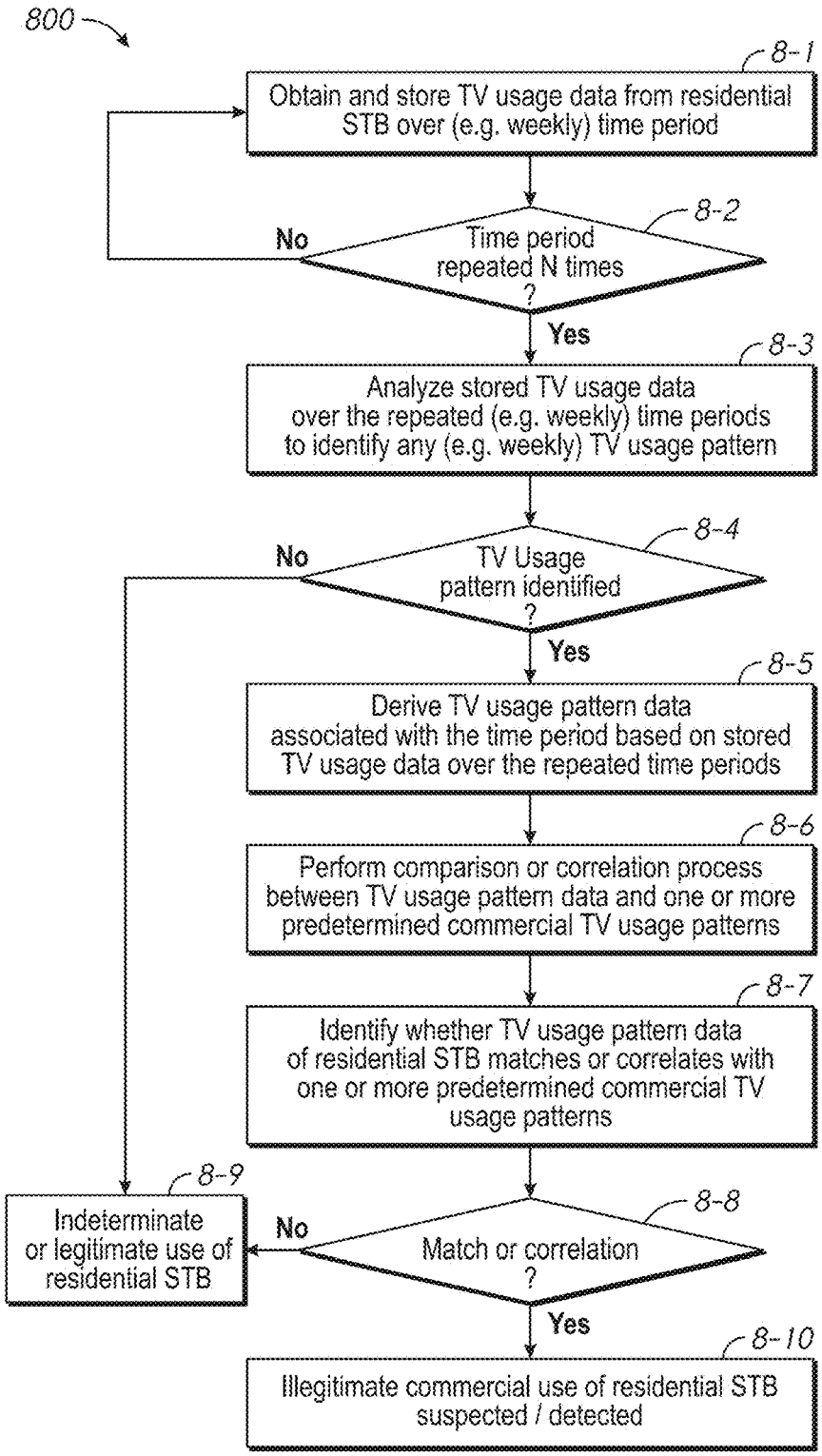
FIG. 8 is a flowchart of a computer/software implemented method for use in identifying an illegitimate use of a residential STB in accordance with some implementations.

FIG. 8 is a flowchart 800 of a computer/software implemented method for use in identifying an illegitimate use of a residential STB in accordance with some implementations. In various implementations, the method of flowchart 800 is performed by a device with one or more processors and non-transitory memory such as a portion or module of the administrative node 240 or the access node 250 in FIG. 2. In some implementations, the method is performed by processing logic, including hardware, firmware, software, or a combination thereof. In some implementations, the method is performed by a processor executing code stored in a non-transitory computer-readable medium (e.g., a memory).

Beginning with block 8-1 of flowchart 800, TV usage data is obtained from a residential STB and stored in memory. The TV usage data may be obtained over a predetermined time period, such as a weekly time period. The obtaining and storing of TV usage data may be repeated for a predetermined number of (e.g. weekly) time periods. For example, the predetermined number of time periods may be three (3) or more; however any suitable number of time periods may be employed.

The TV usage data may be derived based on raw subscriber TV usage data obtained (e.g. via regular uploads) from the set-top box (STB). The raw subscriber TV usage data may be or be referred to as log data from the STB. The raw subscriber TV usage data may indicate ON/OFF times or timeframes of the STB, one or more TV channels watched, one or more TV program IDs corresponding to TV programs watched, one or more times or timeframes of the TV channels and TV programs watched, as some examples.

In block 8-2, upon identifying that TV usage data has been obtained and stored over a predetermined number of (e.g. weekly) time periods, the stored TV usage data are analyzed to identify any (e.g. weekly) pattern in block 8-3. In block 8-4, if there is no pattern identified in the analysis of the stored TV usage data, then the testing is indeterminate or the residential STB is determined to be legitimate. On the other hand, in block 8-4 if there is a TV usage pattern identified over the time period, then the method proceeds to block 8-5.

In block 8-5, TV usage pattern data indicative of a TV usage pattern associated with the time period are derived based on the stored TV usage data obtained over the number of repeated time periods. The TV usage pattern data may be indicative of a general TV usage pattern associated with the residential STB over the (e.g. weekly) time period. For example, the TV usage pattern may be indicative of, for each day of the week, which hours of the day that the residential STB is turned ON and OFF (e.g. ON time periods), and to which TV channels or genres.

In block 8-6, a comparison or correlation process is performed between the TV usage pattern and one or more predetermined commercial TV usage patterns. A predetermined commercial TV usage pattern may be a pattern associated with any suitable commercial establishment, such as a restaurant, pub, bar, hair salon, spa, or other. In some implementation, a predetermined commercial TV usage pattern may be or include a TV ON/OFF pattern corresponding to (e.g. weekly) business hours of a predetermined commercial establishment. The predetermined commercial TV usage pattern may be or include other suitable patterns, such as a fixed usage of a single TV channel (e.g. fixed usage of a single sports channel, a single news channel, or a single food channel), a fixed usage of two or more TV channels of the same genre (e.g. fixed usage of multiple sports channels, or fixed usage of multiple news channels), and a fixed usage of a genre (e.g. fixed usage of TV channels associated with beauty). The predetermined commercial TV usage patterns may be derived based on, for example, actual or estimated commercial TV usage patterns associated with different types of commercial establishments.

In block 8-7, it is identified whether the TV usage pattern data matches or correlates with (e.g. above a threshold value) one of the predetermined commercial TV usage patterns. In block 8-8, if there is no match or correlation (e.g. above a threshold value) identified, then the testing is indeterminate or the residential STB is determined to be legitimate. On the other hand, in block 8-8 if there is a match or correlation (e.g. above a threshold value), then it is detected that the residential STB is (highly suspected to be) associated with illegitimate use. Confidence values or levels associated with illegitimate use of the residential STB may be or be derived from any correlation values obtained from blocks 8-6 and/or 8-7.

Figure 9:
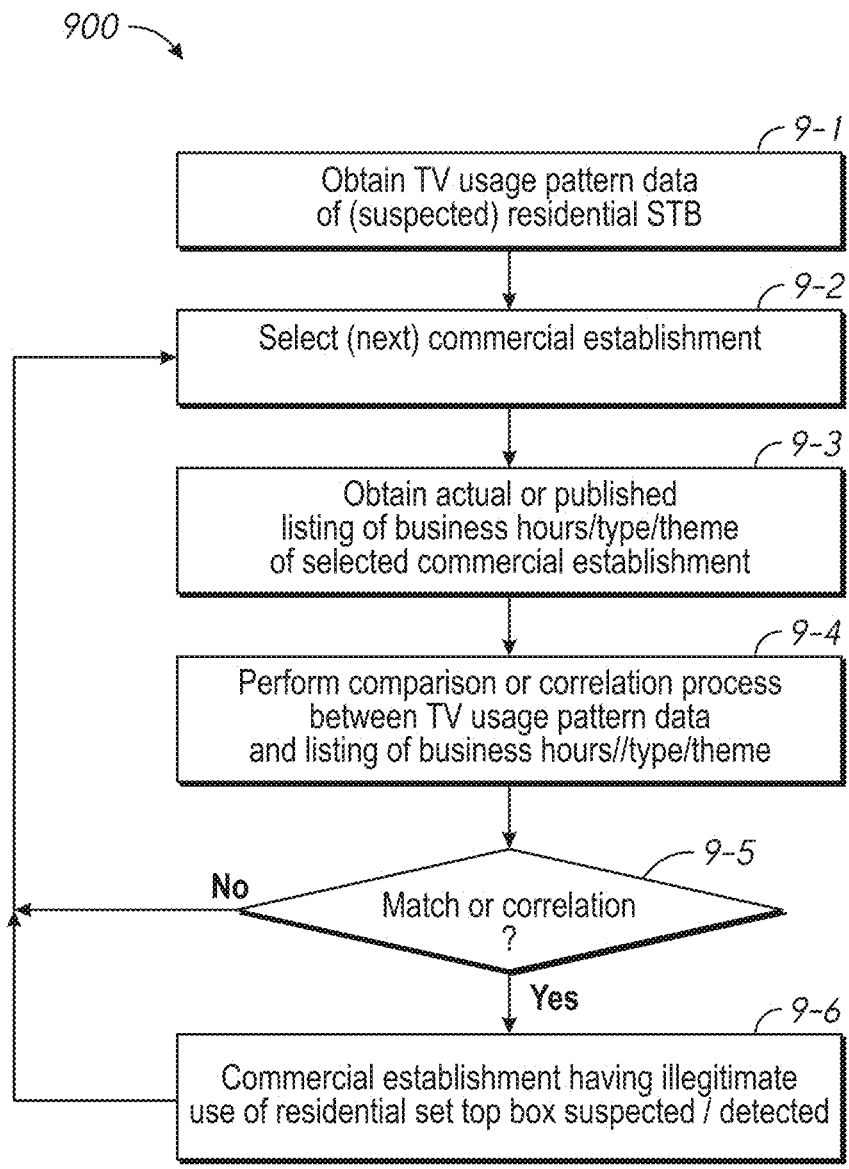
FIG. 9 is a flowchart of a computer/software implemented method for use in identifying a commercial establishment associated with an illegitimate use of a residential STB in accordance with some implementations.

FIG. 9 is a flowchart 900 of a computer/software implemented method for use in identifying a commercial establishment associated with an illegitimate use of a residential STB in accordance with some implementations. The method of FIG. 9 may be performed after performance of the method of FIG. 8 which identifies an illegitimate use of a residential STB. Again, in various implementations, the method of flowchart 900 is performed by a device with one or more processors and non-transitory memory such as a portion or module of the administrative node 240 or the access node 250 in FIG. 2. In some implementations, the method is performed by processing logic, including hardware, firmware, software, or a combination thereof. In some implementations, the method is performed by a processor executing code stored in a non-transitory computer-readable medium (e.g., a memory).

Beginning with block 9-1 of flowchart 900, TV usage pattern data of a residential STB are obtained. The TV usage pattern data may be indicative of a TV usage pattern associated with the residential STB over a predetermined (e.g. weekly) time period of consideration. The TV usage pattern data may be from a residential STB that has been suspected of or detected with illegitimate use (e.g. see FIG. 8). In some implementations, the TV usage pattern data of the residential STB may be obtained as described in relation to block 8-5 of FIG. 8.

In block 9-2, a (suspected) commercial establishment is selected for consideration. In block 9-3, an actual or published listing of business hours/type/theme of the commercial establishment is obtained. The actual or published listing data of business hours/type/theme may correspond to any suitable commercial establishment, such as a restaurant, pub, bar, hair salon, spa, doctors or dentist's office, or other. In some implementations, a business hour listing includes (e.g. weekly) business hours of a predetermined commercial establishment. A listing of business type or theme may correspond to one or more different types or themes, such as sports, food, executive (world news), beauty, healthcare, or other.

In block 9-4, a comparison or correlation process is performed between the TV usage pattern data and the listing data of business hours/type/theme. In block 9-5, it is identified whether the TV usage pattern data matches or correlates with (e.g. above a threshold value) the listing data of business hours/type/theme. If there is no match or correlation (e.g. above a threshold value) identified in block 9-5, then the selected commercial establishment is deemed not to be suspect, and the next commercial establishment is selected for consideration in block 9-2.

On the other hand, in block 9-5 if there is a match or correlation (e.g. above a threshold value), then it is detected that the selected commercial establishment is (highly suspected to be) associated with the illegitimate usage of the residential STB. Confidence values or levels associated with illegitimate use of the residential STB may be or be derived from any correlation values obtained from blocks 9-4 and/or 9-5.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular embodiments only and is not intended to be limiting of the claims. As used in the description of the embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The invention claimed is:

1. A method comprising:
   at a device, determining one or more suspicious devices within a scope that match a commercial usage model within a predefined tolerance based on media content usage pattern data derived for the one or more suspicious devices, wherein the one or more suspicious devices are suspected of being illegitimately used;

determining a predicted location of use for the one or more suspicious devices; and verifying illegitimate use of at least some of the one or more suspicious devices.

2. The method of claim 1, wherein determining a predicted location for each suspicious device includes:

generating, for a respective suspicious device among the one or more suspicious devices, a confidence score for each of a plurality of candidate locations of the respective suspicious device based on auxiliary information; and selecting the candidate location with the highest confidence score as the predicted location of the respective suspicious device.

3. The method of claim 2, wherein the auxiliary information includes extrinsic information associated with at least one of business hours or business descriptions for commercial locations within the scope.

4. The method of claim 1, further comprising, presenting a user interface that includes the one or more suspicious devices according to their corresponding predicted locations of use.

5. The method of claim 1, wherein verifying the illegitimate use of at least some of the one or more suspicious devices includes transmitting verification data to the one or more suspicious devices.

6. The method of claim 1, wherein the scope corresponds to a geographic area.

7. The method of claim 1, wherein the one or more suspicious devices comprise residential set-top boxes (STBs), and the usage model corresponds a default usage model for residential STBs in a commercial location.

8. A method comprising:
at a device:
obtaining and storing TV usage data associated with a residential set-top box (STB) over a plurality of repeated time periods;
deriving TV usage pattern data associated with the residential STB based on the stored TV usage data obtained over the repeated time periods; and
identifying a suspected illegitimate use of the residential STB based on identifying a match or correlation between the TV usage pattern data and a predetermined commercial TV usage pattern.

9. The method of claim 8, wherein the repeated time periods comprise repeated weekly time periods.

10. The method of claim 8, wherein the predetermined commercial TV usage pattern is indicative of a TV ON pattern corresponding to weekly business hours of a restaurant or bar.

11. The method of claim 8, wherein the predetermined commercial TV usage pattern is indicative of a fixed usage of a single TV channel.

12. The method of claim 8, wherein the predetermined commercial TV usage pattern comprises a fixed usage of TV sports channels.

13. The method of claim 8, wherein the predetermined commercial TV usage pattern comprises a fixed usage of a genre.

14. The method of claim 8, further comprising:
at the device,
for each one of one or more predetermined TV usage patterns, performing a comparison or correlation between the TV usage pattern data and the predetermined commercial TV usage pattern.

15. The method of claim 8, further comprising:
for each listing data of one or more published business hour listings of one or more commercial establishments,
comparing or performing a correlation between the TV usage pattern data and the listing data; and
identifying a suspected commercial establishment associated with illegitimate use of the residential STB based on identifying a match or correlation between the TV usage pattern data and the listing data of the suspected commercial establishment.

16. A device comprising:
one or more processors;
a non-transitory memory; and
one or more programs stored in the non-transitory memory, which, when executed by the one or more processors, cause the device to:
obtain and store TV usage data associated with a residential set-top box (STB) over a plurality of repeated time periods;
derive TV usage pattern data associated with the residential STB based on the stored TV usage data obtained over the repeated time periods; and
identify a suspected illegitimate use of the residential STB based on identifying a match or correlation between the TV usage pattern data and a predetermined commercial TV usage pattern.

17. The device of claim 16, wherein the repeated time periods comprise repeated weekly time periods.

18. The device of claim 16, wherein the predetermined commercial TV usage pattern comprises at least one of:
a TV ON/OFF pattern corresponding to weekly business hours of a restaurant or bar;
a fixed usage of a single TV channel;
a fixed usage of TV sports channels; and
a fixed usage of a genre.

19. The device of claim 16, wherein the one or more programs, when executed by the one or more processors, cause the device to:
for each listing data of one or more published business hour listings of one or more commercial establishments,
compare or perform a correlation between the TV usage pattern data and the listing data; and
identify a suspected commercial establishment associated with illegitimate use of the residential STB based on identifying a match or correlation between the TV usage pattern data and the listing data of the suspected commercial establishment.

* * * * *

UNITED STATES PATENT AND TRADEMARK OFFICE
CERTIFICATE OF CORRECTION

PATENT NO. : 10,205,997 B2
APPLICATION NO. : 15/628302
DATED : February 12, 2019
INVENTOR(S) : Epstein et al.

Page 1 of 1

It is certified that error appears in the above-identified patent and that said Letters Patent is hereby corrected as shown below:

On the Title Page

Item (72) Inventor is corrected to read:
-- Steven Jason Epstein, Hashmonaim, (IL);
Orly Ovadia Amsalem, Jerusalem, (IL);
Nadav Avikasis, Cfar-Adoomin, (IL);
Hillel Michael Solow, Beit Shemesh, (IL);
Ezra Galili, Modiin, (IL) --.

Signed and Sealed this
Eighteenth Day of February, 2020

Andrei Iancu
*Director of the United States Patent and Trademark Office*